(12) United States Patent
Hsu et al.

(10) Patent No.: US 7,519,130 B2
(45) Date of Patent: Apr. 14, 2009

(54) FRONT END INTERFACE FOR DATA RECEIVER

(75) Inventors: Louis L. Hsu, Fishkill, NY (US); Matt R. Cordrey-Gale, Droxford (GB); James S. Mason, Eastleigh (GB); Philip J. Murfet, Stockbridge (GB); Karl D. Selander, Hopewell Junction, NY (US); Michael A. Sorna, Hopewell Junction, NY (US); Huihao Xu, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 10/905,705

(22) Filed: Jan. 18, 2005

(65) Prior Publication Data

US 2006/0159200 A1 Jul. 20, 2006

(51) Int. Cl.
*H04L 25/34* (2006.01)
(52) U.S. Cl. .................. 375/292; 326/30; 327/100; 327/107; 327/355; 375/257
(58) Field of Classification Search .................. 327/70, 327/355; 326/30; 702/58; 324/534
See application file for complete search history.

(56) References Cited

U.S. PATENT DOCUMENTS

| | | | |
|---|---|---|---|
| 5,426,389 A * | 6/1995 | Webster | 327/170 |
| 5,760,629 A | 6/1998 | Urabe et al. | |
| 6,326,803 B1 * | 12/2001 | Takeda | 326/30 |
| 6,583,661 B1 * | 6/2003 | Tanji et al. | 327/355 |
| 2004/0114670 A1 | 6/2004 | Cranford, Jr. et al. | |
| 2004/0230387 A1 * | 11/2004 | Bechhoefer | 702/58 |
| 2004/0251913 A1 * | 12/2004 | Pharn et al. | 324/534 |
| 2005/0281343 A1 | 12/2005 | Hsu et al. | |

* cited by examiner

*Primary Examiner*—David C Payne
*Assistant Examiner*—Adolf Dsouza
(74) *Attorney, Agent, or Firm*—Steven Capella; Daryl K. Neff

(57) ABSTRACT

A data receiver is provided which includes a front end interface circuit having an alternating current (AC) transmission receiving mode and a direct current (DC) transmission receiving mode. The front end interface circuit includes an offset compensation circuit operable to compensate a DC voltage offset between a pair of differential signals input to the data receiver. The front end interface circuit further includes an AC/DC selection unit operable to switch between (a) the DC transmission receiving mode, and (b) the AC transmission receiving mode, such that the data receiver is operable in (i) the DC transmission mode in which the offset compensation circuit is disabled, (ii) the DC transmission mode in which the offset compensation circuit is enabled, (iii) the AC transmission mode in which the offset compensation circuit is disabled, and (iv) the AC transmission receiving mode in which the offset compensation circuit is enabled.

3 Claims, 9 Drawing Sheets

DC Coupling

AC Coupling

FRONT END INTERFACE FOR DATA RECEIVER

BACKGROUND OF THE INVENTION

The present invention relates to data receivers, especially for high-speed wired communications.

High-speed serial data transmission is conventionally performed according to either a direct current (DC) coupled scheme or an alternating current (AC) coupled scheme, as shown in FIGS. 1 and 2, respectively. In a DC coupled scheme, as shown in FIG. 1, the transmitter is conductively connected to the receiver at DC as well as AC via a DC conducting medium, e.g., through one or more cards, cables, connectors, packages, and backplanes, etc. By contrast, as shown in FIG. 2, in an AC coupled scheme, AC coupling capacitors 7 are placed in the path of signals between the transmitter and remote receiver to allow only AC signals to pass, while blocking the flow of current at DC between the transmitter and receiver. For this reason, the AC coupling capacitor is also known as a DC blocking capacitor. DC blocking capacitors can be provided on the same integrated circuit, i.e., the "chip" which contains the transmitter or the receiver, or otherwise on the same package or in a discrete device provided off the chip. The values of DC blocking capacitors typically range between about 10 nF and about 100 nF.

The DC coupled scheme is used only when transmitter and receiver are designed to operate at the same or a similar common mode voltage level. FIG. 1 illustrates a serial data communication system including a transmitter 2, a receiver 3, and a pair of differential signal lines 4 and 5 which carry a pair of differential signals Dn and Dp representing a data bit signal between the transmitter 2 and the receiver 3. In such communication system, the common mode supply voltage Vtr to the receiver is set to the same level as the common mode supply voltage Vtt to the transmitter, to avoid DC current flow between the transmitter and the receiver.

In some DC coupled systems, the transmitter and receiver are designed to perform best when operated together as a matched pair, in which case the transmitter and receiver are said to be "compatible". At minimum, DC coupling requires that the common mode level of the signal arriving at the receiver is within the range in which the receiver is designed to operate.

However, when the common mode level of the signal arriving at the receiver lies outside of the voltage range that the receiver is designed to handle, the receiver cannot amplify the signal efficiently. Poor data recovery then results. In such a case, or when the common mode level of the arriving signal is not known a priori, an AC coupled scheme is recommended, instead of a DC coupled scheme. With reference to FIG. 2, in an AC coupled communication system, the receiver independently sets the common mode level of the received signal to a predetermined desirable level. In AC coupled systems, this is accomplished through the use of a supply voltage ("Vtr") at the receiver to supply a DC current for maintaining the common mode signal level, in a manner which is independent from the supply voltage Vtt used to maintain the common mode signal level at the transmitter. As also shown in FIG. 2, a termination resistor 8, having a value matching the impedance of the transmission line, e.g., 50 ohm, is placed between a supply voltage Vtr and the data input signals.

Although an AC coupled scheme is advantageous for filtering out low-frequency noise and relaxing common mode demand, it requires that the data signal be transmitted according to a DC balanced code. Stated another way, the data signal arriving at the receiver must have an equal number of bits having the value "1" as the number of bits having the value "0" bits within each sequentially transmitted block having a given number of data bits. This is needed in order to prevent the common mode voltage level of the signal from shifting. An AC coupled scheme also requires the data signal to transition frequently between "1"s and "0"s. In other words, the receiver cannot properly decode a signal in which a long consecutive string of "1s" or "0s" appears at the input to the receiver. Moreover, in systems in which only the data signal is transmitted but not the clock, it is difficult to recover the clock from the transmitted signal when the transmitted signal has long strings of either "1"s or "0"s. An "8b10b" code is an example of a DC balanced code. An 8b10b code guarantees that the data signal transitions at least twice for every 10 bits. However, the 8b10b code is not without drawbacks. A data signal transmitted via an 8b10b code requires 10 signal bits to transfer 8 bits of information, equivalent to 20% of bandwidth loss. For these reasons, it is desirable to avoid using an AC coupled transmission scheme except in situations in which the voltage supply levels used at the transmitting and receiving ends of a communication system are incompatible.

It would be desirable to provide a front end interface for a serial data communication receiver which can be utilized in multiple ways, in communication systems which are DC coupled as well as AC coupled, and in high-speed environments in which channel characteristics cannot be predicted a priori. Heretofore, such flexibility has not been available in SerDes communication systems.

FIG. 3 is a block diagram illustrating the architecture of a prior art receiver complex 10 which has a targeted data transmission rate of between 2.5 and 3.2 Gbs. The receiver complex 10 has a front end interface unit FEI 11 at the input end of the receiver 12, the FEI 11 providing line terminations for the differential signals Dn and Dp and circuitry for switching between modes for AC coupling and DC coupling. However, the FEI 11 provides only fixed termination impedances to the differential signal lines Dn and Dp arriving at the receiver 12 (and also to lines Dn' and Dp'), making its design somewhat inflexible. The receiver complex 10 also includes a built-in-self-test (BIST) unit 16, which verifies operation upon initializing the receiver 12 by inputting a known test data pattern into the receiver 12 and then verifying the outcome. The BIST unit 16 raises an "ERROR" flag 19 when the receiver 12 does not correctly receive the test data pattern.

The receiver 12 includes a pre-amplifier 210, a sample latch 220, and 2:1 demultiplexer 230, also referred to herein as a "demux". The pre-amplifier 210 amplifies the incoming signals using a peaking device to extend the bandwidth. A pair of latches is provided in the sample latch 220. Each takes a one-half rate clock signal (as compared to the recovered clock rate of the incoming data signal) from a clock and data recovery circuit CDR 18 and uses it to sample and latch alternate bits from the signal data stream output by the pre-amplifier. The demultiplexer 230 has two latches. Each of the latches in the demultiplexer 230 then uses a one-quarter rate clock signal to demultiplex the data and then feed the data into a shift register inside a decision feedback equalizer (DFE) 13. The DFE 13 operates as a deserializer as well as an adaptive equalizer. The DFE takes the amplified and latched data signal and outputs n bits of data in parallel to logic circuitry as Dout.

The DFE makes a decision as to the value of the present bit in a serial stream of bits (as signals Dn" and Dp") that appears at the receiving end of the channel. The DFE operates by weighting the voltage of the present bit with the values of the bits that come before the present bit and the bits that come after the present bit. As an adaptive equalizer, the coefficients used to weight the values of the bits are updated during operation of the DFE in response to changes that occur in the channel, as well as changes that occur in the degree of intersymbol interference. The prior art receiver complex 10 may be operated in conjunction with a transmitter having a feed forward equalizer (FFE), in which the tap coefficients cannot be adjusted by feedback based on the results of receiving operation by the DFE 13. Receiver complex 10 has no provision for transmitting information for updating FFE coefficients of the transmitter from the receiver complex 10 back to the transmitter.

In the receiver complex 10 shown in FIG. 3, the clock data recovery (CDR) unit 18 extracts the clock from the incoming data stream using a phase rotator and a clock recovery algorithm. Through output 21, the CDR over-samples the differential data signals at the output of the pre-amplifier 210 and a digital circuit detects the time position of an edge (signal transition) of the differential data signals. The CDR determines a desirable time position at which to sample the differential data signals. The clock signal 22 generated by the CDR is used to operate the DFE 13. Feedback 20 from the DFE assists the CDR in maintaining the edge of the generated clock signal at the correct position.

Ideally, a front-end interface unit should be adapted for use in both an AC coupled transmission scheme and a DC coupled scheme. FIG. 4 is a schematic diagram depicting a front-end interface circuit according to the prior art. In this prior art circuit, the pair of resistors Rup and Rdn are used to terminate the signals PADP and PADN, respectively. A power-down signal (PWDN) and a mode selecting signal (ACMODE) are used to set the receiving mode to either AC or DC coupling modes. DC coupled mode is selected when the control signals presented to the circuit have the values PWDN=0, and ACMODE=1. In DC coupled mode, transistor P11 is turned on, and transistors P12 and N12 are turned off. This sets the common mode voltage level Vcm of the differential signals presented to the receiver to the same level (Vtr) that the signals are transmitted by the transmitter.

Referring again to FIG. 2, in the AC coupled mode, the transmitted differential signals are coupled through AC coupling capacitors 7 to the receiver. At the front end interface device, the AC coupled mode is selected when the signals presented to the front end interface circuit have the values PWDN=0, ACMODE=0. This causes the transistors P12 and N12 to be turned on, and transistor P11 to be turned off. The common mode voltage (Vcm) of the differential signals is set to a value of between about 0.6 times and 0.8 times the power supply voltage Vdd (FIG. 4) by the resistive divider formed by resistors R1 and R2. However, some drawbacks of the front end interface circuit shown in FIG. 4 are that it does not perform DC offset cancellation, nor test for cable faults, nor provide for up-channel communication, such as is needed to transmit equalization information back to the transmitter for use in adjusting coefficients of a feed-forward equalizer at the transmitter.

Accordingly, it would be desirable to provide a receiver complex and method for receiving signals in which the aforementioned limitations of the prior art are addressed.

SUMMARY OF THE INVENTION

According to one aspect of the invention, a data receiver is provided which includes a front end interface circuit having an alternating current (AC) transmission receiving mode and a direct current (DC) transmission receiving mode. The front end interface circuit includes an offset compensation circuit operable to compensate a DC voltage offset between a pair of differential signals input to the data receiver. The front end interface circuit further includes an AC/DC selection unit which is operable to switch between (a) the DC transmission receiving mode, and (b) the AC transmission receiving mode, such that the data receiver is operable in (i) the DC transmission mode in which the offset compensation circuit is disabled, (ii) the DC transmission mode in which the offset compensation circuit is enabled, (iii) the AC transmission mode in which the offset compensation circuit is disabled, and (iv) the AC transmission receiving mode in which the offset compensation circuit is enabled.

DETAILED DESCRIPTION

Figure 5:
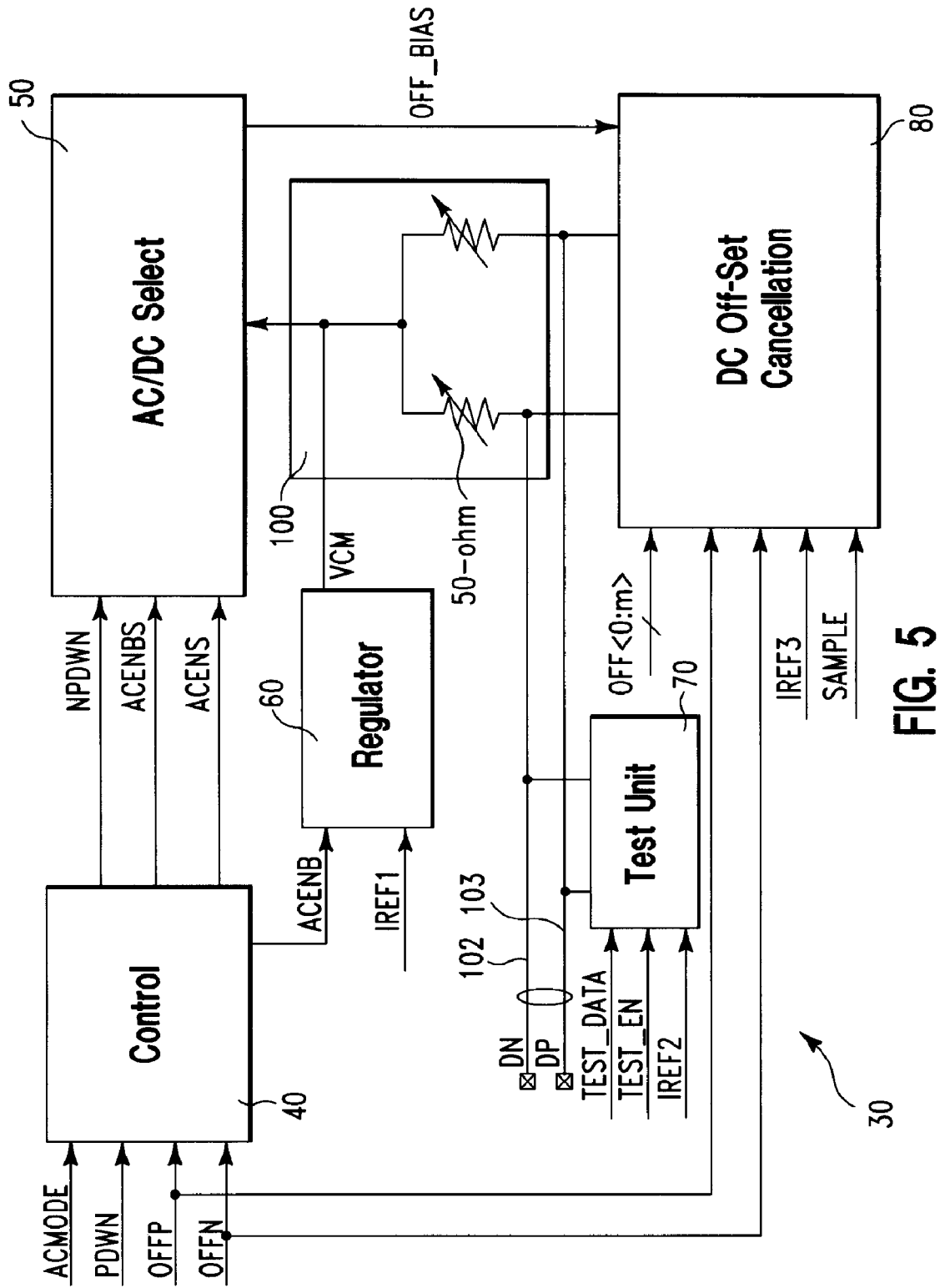
FIG. 5 is a block and schematic diagram illustrating a front-end-interface (FEI) unit according to an embodiment of the invention.

With reference to FIG. 5, a front end interface unit 30 according to one embodiment of the invention includes six functionally defined units: an adjustable termination network unit 100, a control unit 40, an AC/DC mode selection unit 50, a regulator 60, a test unit 70, and a DC offset cancellation unit 80. The front end interface unit is designed for use in a receiver complex 10 such as that shown and described above with respect to FIG. 3. The front-end interface (FEI) unit 30 has AC and DC operational modes for operation according to both an AC coupled transmission scheme and a DC coupled transmission scheme, respectively.

Termination network 100 provides coarse and fine control over adjustable values of impedances used to terminate the differential signal lines 102 and 103 on which the data signals Dn and Dp arrive at the receiver complex 30. Through a set of binary vectors input to the termination network 100, the values of the terminating impedances are controlled according to a preset resolution to match the impedance presented at the package interface, to improve signal integrity by reducing the return loss. Circuitry for programmably adjusting the value of terminating impedances is described in commonly assigned U.S. patent application Ser. No. 10/250,177 filed Jun. 10, 2003, the entirety of which is hereby incorporated herein by reference.

The AC/DC selection unit 50 provides a variable amount of current to the termination network 100 according to whether AC or DC mode operation is selected. Selection unit 50 also programmably controls an amount of impedance used to terminate the differential signal lines 102, 103. The regulator 60 (FIG. 8) is used to regulate the common mode voltage level of the differential signal lines 102, 103 provided to the programmable termination network 100 (FIG. 5). A plurality of control bits, for example, six binary bits, are provided for selecting impedance elements to adjust the values of terminating resistors and reactive (capacitive and/or inductive) impedance elements. Such on-chip programmably adjustable impedance matching helps to reliably provide a matched terminating impedance, despite variations, including frequency-dependent variations, which might not be expected in the impedance present at the receiver, e.g., due to the interface to external circuits and the package interface.

Figure 7:
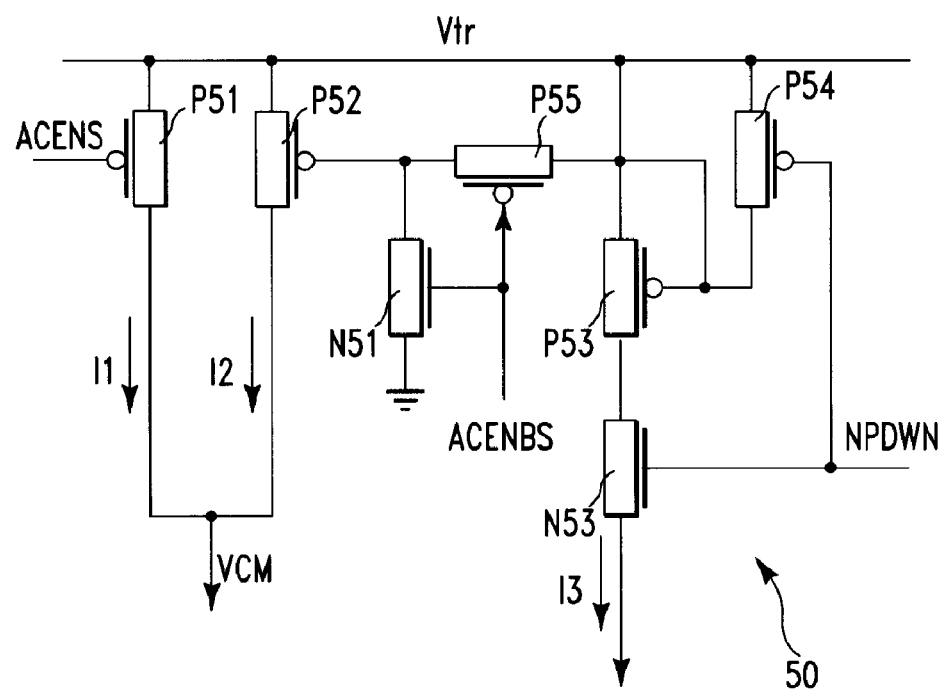
FIG. 7 is a schematic diagram illustrating an AC/DC selection unit according to an embodiment of the invention.

The AC/DC mode selection unit 50 (FIG. 7) functions to operate the receiver complex in either AC or DC-coupled modes. Control over the selection of AC coupling mode versus DC coupling mode is performed as follows. Control signals ACMODE and PDWN, generated by logic circuitry, are input to the control unit 40, which in turn provides the AC and DC mode selection signals ACENS and ACENBS and power down control signal NPWDN to the AC/DC select unit 50. The control signals "ACENS", "ACENBS" and "NPDWN" are used to select the mode or shut down the power in this unit, respectively, on conditions as shown in Table 1.

TABLE 1

| ACENS | NPDWN | For | Or |
|---|---|---|---|
| 0 | 0 | DC coupled Scheme | |
| 0 | 1 | NA | |
| 1 | 0 | PDWN | AC coupled scheme without offset compensation |
| 1 | 1 | AC with offset Compensation | |

Figure 6:
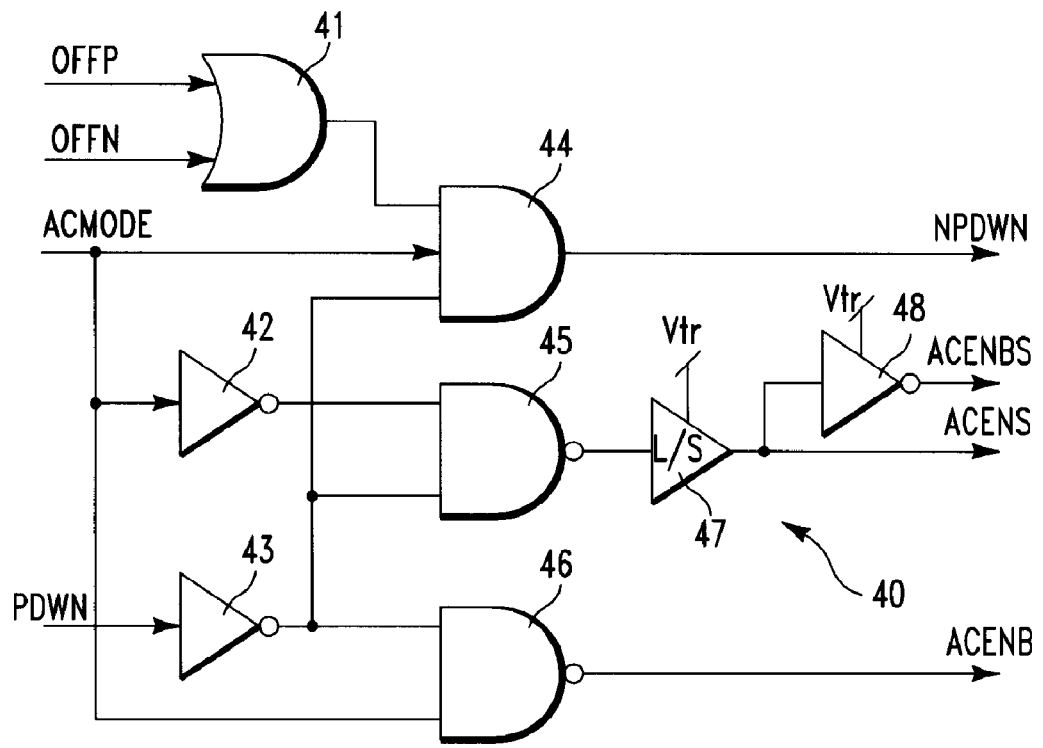
FIG. 6 is a schematic diagram illustrating a control unit according to an embodiment of the invention.

Referring to FIG. 6, a control unit 40 of the FEI has logic circuitry for providing control signals to select AC or DC coupling modes using the ACMODE signal, DC offset cancellation using signals OFFP and OFFN, and to shut power off to the receiver complex 10 using PDWN. A level shifter 47 is used to shift the voltage level higher from a default signal level Vdd to voltage level Vtr in accordance with the transmitter Vtr so that AC enable control signals such as ACENS and ACENBS can be used by the AC/DC mode selection unit 50 (FIG. 5).

For example, when both "ACENS" and "NPDWN" are low, DC coupled mode is selected. In this embodiment, it is possible to sink different amounts of current into the signal common mode voltage level (Vcm) depending upon whether the receiver complex is operated in DC or AC coupled mode. It is known for DC coupled mode that there is a demand for about 30 mA of current sinking into the node Vcm. In the DC coupled mode, both P51 and P52 of the AC/DC selection unit 50 (FIG. 7) are fully switched on to allow the maximum "I1"

and "I2" current to flow through the devices. On the other hand, in AC coupled mode, no current will sink to Vcm, provided that there is no DC offset on the differential pair. In AC coupled mode, or when "ACENBS" is asserted, and when the offset compensation circuit 80 (FIG. 5) is also activated, some DC offset is detected. In such case, transistor P51 is shut off and transistor P52 is partially turned on. In that event, the amount of current "I2" that flows through P52 is now controlled by the mirror device of P53 with a current "I3" that is sunk to the node named OFF_BIAS. The amount of the current "I2" depends on the magnitude of the DC offset.

A third case occurs when ACENS=1, and NPDWN=0. Under that condition, no current is sunk to node Vcm. This applies to both cases in which the receiver complex is powered down and when the AC coupled mode is used without DC offset compensation. Since in the AC coupled mode, signals are capacitively coupled from the transmitter side, no DC current is required.

Figure 8:
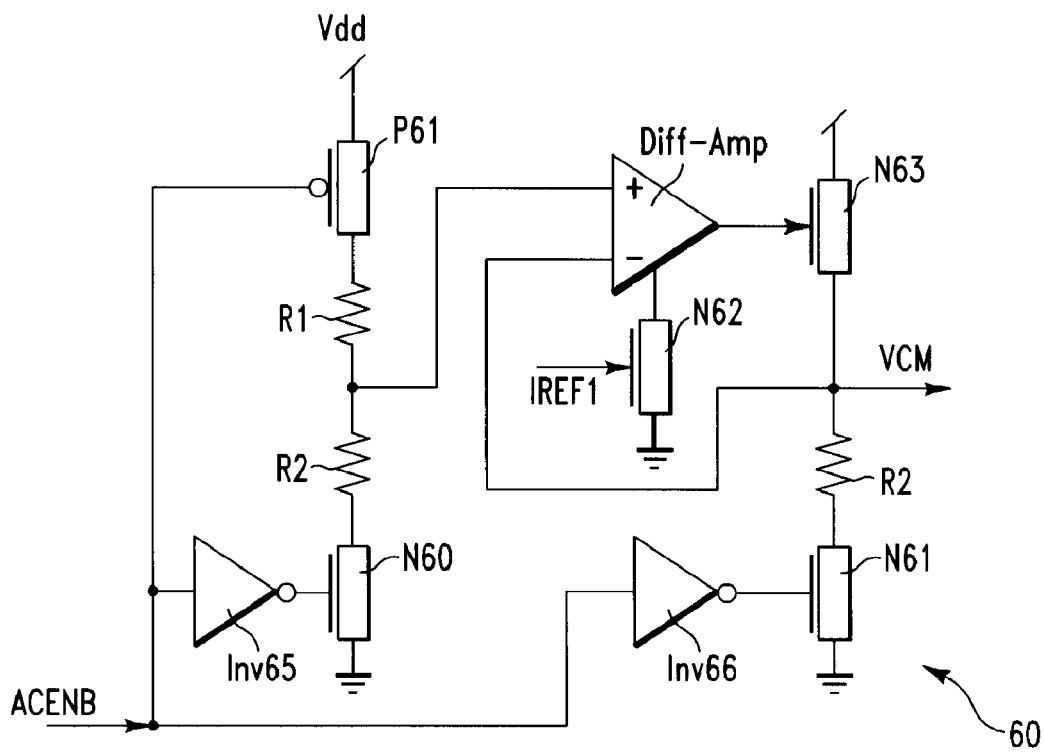
FIG. 8 is a schematic diagram illustrating a common mode voltage level regulator according to an embodiment of the invention.

Control over the level of the common mode voltage Vcm used in the AC and DC coupled modes as follows. In the AC coupled mode, ACENB=0, which turns on both PMOS devices P61 and N60 of the differential amplifier-based regulator 60 (FIG. 8) to hold the Vcm node at a preset level, based on the values of resistors R1 and R2. In the DC coupled mode, the signal ACENB=1 which turns off the PMOS devices P61 and N60 of the regulator 60 such that the Vcm node is not regulated, but is instead tied to the Vtr voltage supply via the transistors P51 and P52 shown in FIG. 7. In that case, the Vcm node is regulated via a reference current IREF1 applied to a tail device N62 to bias the differential amplifier of the regulator 60, as shown in FIG. 8.

Thus, the AC/DC selection unit 50 facilitates the following: (1) DC current control in DC coupled mode; (2) AC current control in AC coupled mode when a DC offset requiring compensation is detected; (3) AC current control when no DC offset is detected; and (4) a facility to power down the receiver complex by shutting off the flow of current thereto.

Referring again to FIG. 5, the test unit 70 enables the transmission of signals on the differential signal lines 102, 103 in an up-channel direction towards a remote transmitter that is ordinarily coupled for communication from the transmitting end of those signal lines 102, 103. A particular embodiment of a circuit permitting communication of information from a SerDes receiver complex in an up-channel direction back to a transmitter is described in commonly assigned U.S. patent application Ser. No. 10/319,705 filed Dec. 13, 2002, the entirety of which is hereby incorporated herein by reference. A system for generating information at a receiver for updating coefficients of an FFE and for transmitting that information back to the transmitter is described in commonly assigned U.S. patent application Ser. No. 10/710, 064 filed Jun. 16, 2004, the entirety of which is hereby incorporated herein by reference.

The test unit 70 is used to test the operability of the cable 55 including the differential signal lines 102, 103 during a test mode. The up-channel communication unit 70 transmits equalization information on the differential signal lines 102, 103 back to a remote transmitter that ordinarily transmits the differential data signals Dn and Dp, that equalization information being used to set and update the tap coefficients of the FFE that resides in the remote transmitter. In one embodiment, when the test unit 70 is active for upchannel communication, the equalization information may include only adjustment values for altering the current values of the tap coefficients. In another embodiment, the equalization information may include either such adjustment values or the tap coefficients themselves.

Figure 9:
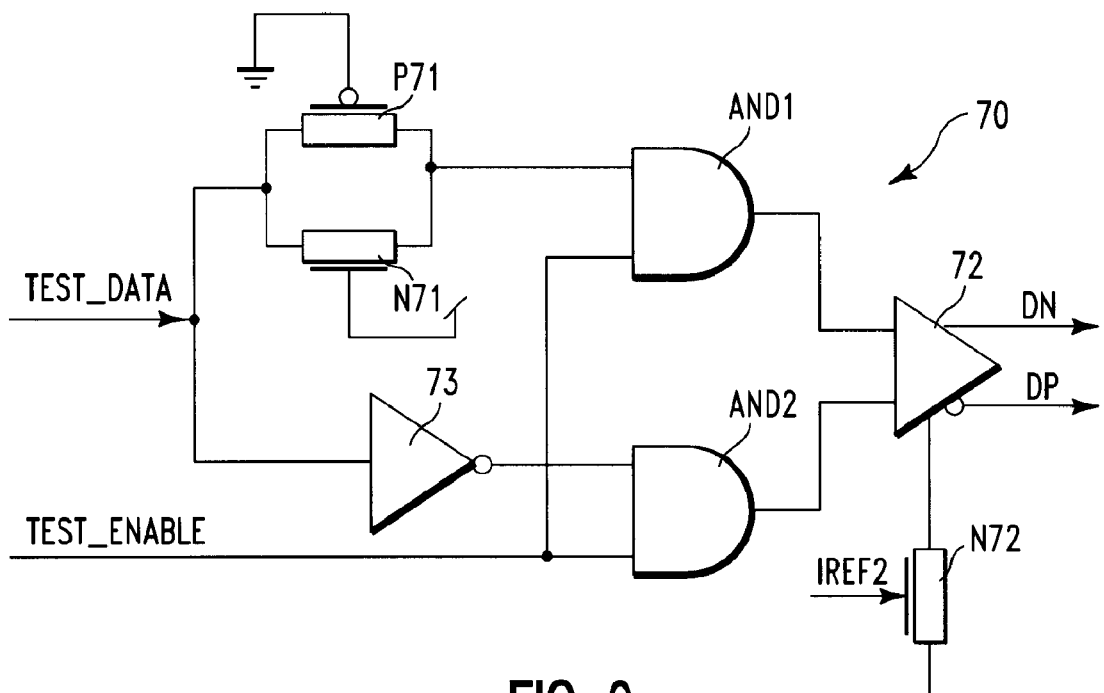
FIG. 9 is a schematic diagram illustrating a test unit according to an embodiment of the invention.

In a particular embodiment, a test unit 70, shown in FIG. 9, utilizing a single-ended incoming data signal "TEST_DATA" and a control signal "TEST_ENABLE", is used to perform (1) up-channel communication, (2) testing the receiver, and (3) testing the cables. For upchannel communication, a single-ended data signal TEST_DATA is converted to a pair of differential signals via an inverter 73, a transmission gate formed by a pMOS device P71, and a NMOS device N71, both of which are biased on. These are followed by AND gates AND1 and AND2, and a current mode logic ("CML") circuit 72 which is biased by a reference current IREF2 inputted to tail device N72. The CML circuit 72, also referred to as a "CMOS differential amplifier", is operable to output differential signals even when the input signal thereto has a high switching speed and small signal swing. The CML circuit 72 is used to produce the pair of differential signals DN and DP. Whenever the TEST_ENABLE is asserted, the test unit is activated. Otherwise, in the normal mode, the test unit is turned off.

Figure 1:
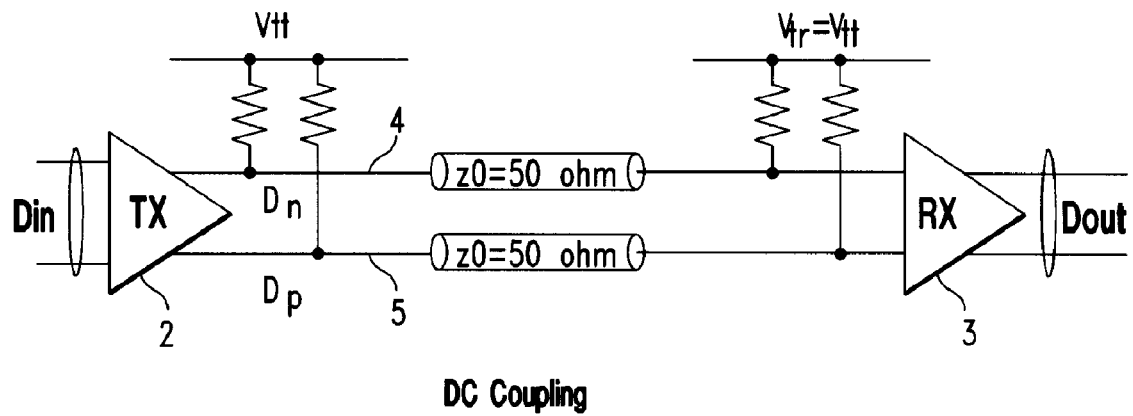
FIG. 1 is a diagram illustrating a communication system in which a transmitter and a receiver are connected via DC coupling.
Figure 2:
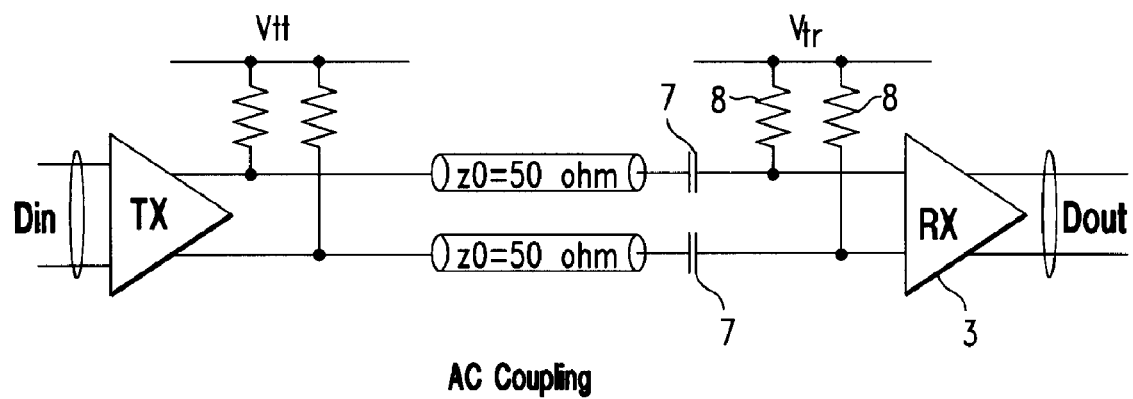
FIG. 2 is a diagram illustrating a communication system in which a transmitter and a receiver are connected via AC coupling.
Figure 3:
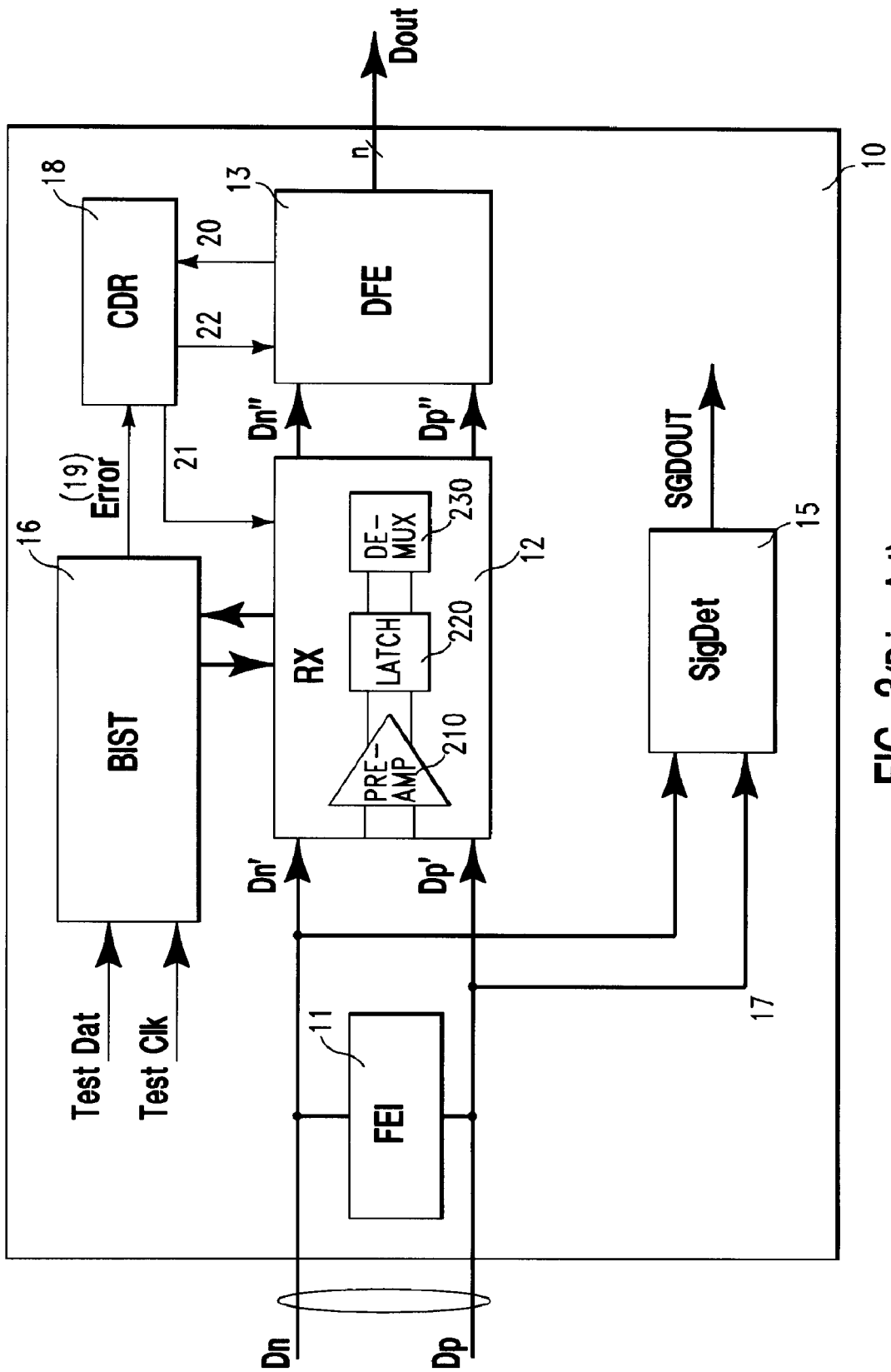
FIG. 3 is a diagram of a prior art receiver complex which is background to the present invention.
Figure 4:
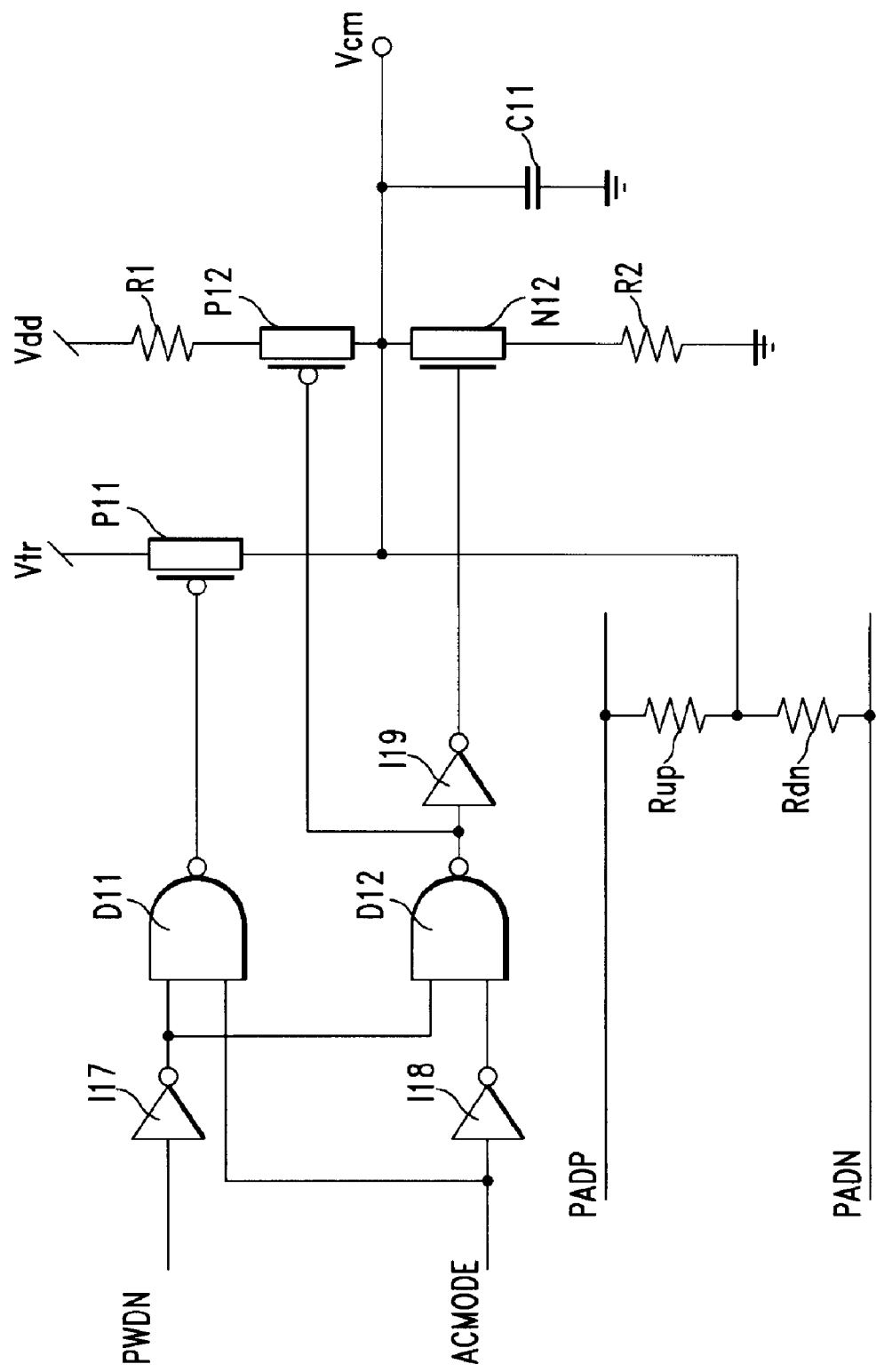
FIG. 4 is a diagram illustrating a prior art front end interface.

The test unit 70 can test the receiver 12 (FIG. 3) when the data from a remote transmitter is not available. It can also test the signal detector 15 (FIG. 3). The test unit can also be used to test for cable faults, including a single-side stuck-at fault, which cannot be detected by typical signal detectors according to the prior art. Such detection of cable stuck-at faults from the receiver side is especially advantageous.

Figure 10:
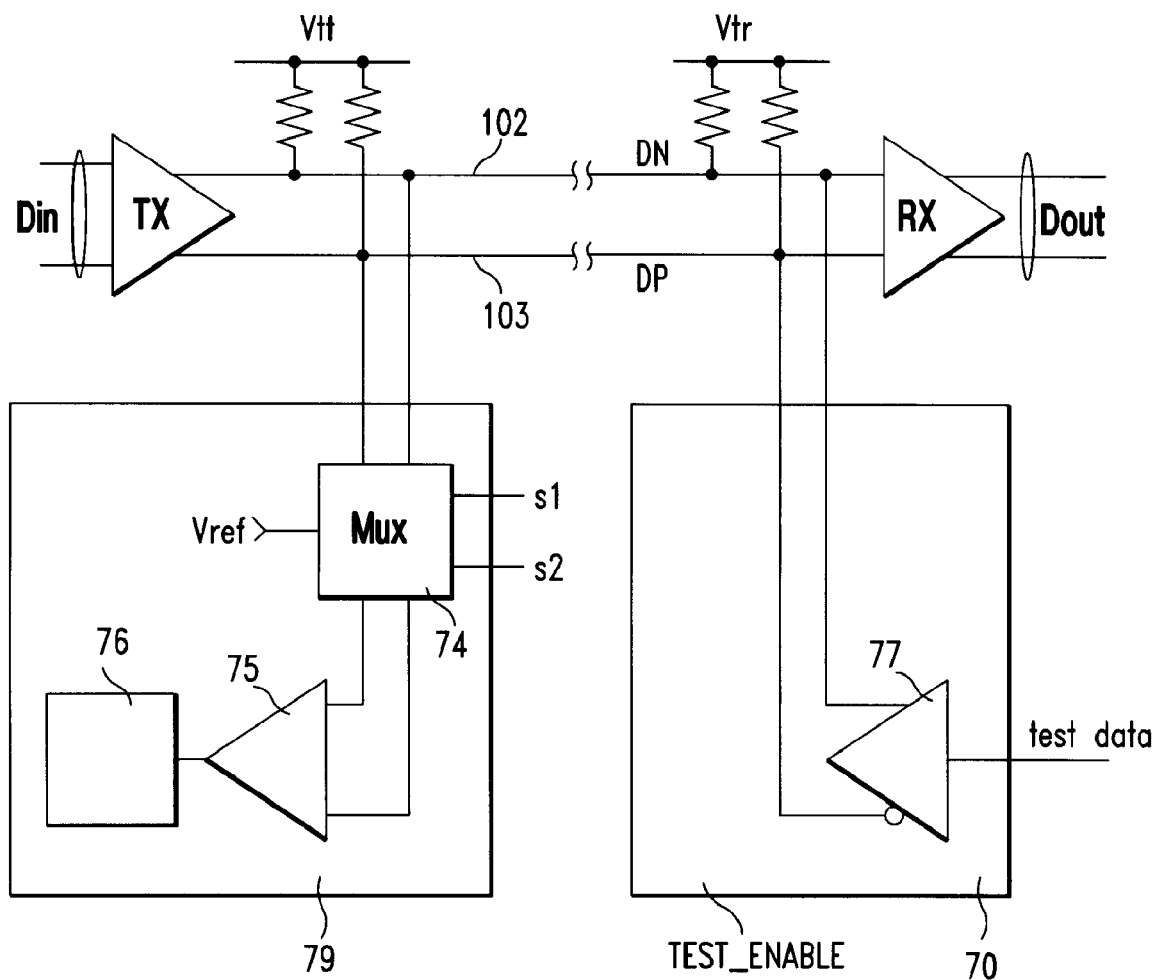
FIG. 10 is a diagram illustrating a setup for identifying a fault in a cable connecting the transmitter to a receiver, according to one embodiment of the invention.

A stuck-at fault is one in which one of the differential signal lines 102, 103 fails to transition between high and low voltages representing the communication signal levels. A setup for detecting a cable stuck-at fault is shown in FIG. 10. At the transmitter side, a multiplexer (MUX) unit 74, a buffer 75 and a latch 76 are needed to sense the fault. Two control pins: S1, S2, and a reference voltage Vref are used to select the test mode. As listed in Table 2, operation is controlled according to four different conditions.

TABLE 2

| S1 | S2 | Cases |
|----|----|-------|
| 0  | 0  | Disconnect |
| 0  | 1  | Select DN |
| 1  | 0  | Select DP |
| 1  | 1  | Upchannel Communication |

These conditions are: (1) S1=S0=0 for normal operation mode in which the MUX 74 is disconnected from the cable so that loading of the transmitter is reduced. In one test mode, case (2), S1=0 and S2=1. A first cable 102 on which signal DN is transmitted is selected for testing. These faults are tested by comparing the propagation of a high or low differential signal level at DC to the reference voltage Vref. Using the setup shown in FIG. 10, both cable stuck-at fault conditions can be detected, whether the cable is stuck at a "low voltage" level, or at the "high voltage" level. In a second test mode, case (3) S1=1 and S2=0, then second cable 103 on which DP is transmitted is selected for testing. In another case (4) both S1=S2=1, in which up-channel communication mode is selected. In that case, equalization information for adjusting the coefficients of a FFE at the remote transmitter can be transmitted in an upchannel direction from the FEI back towards that transmitter. Since the characteristics of the signal used for upchannel communication and those used for cable fault detection are lower in frequency than the normally transmitted differential data signals DN and DP, in that mode the reference voltage (Vref) can be set at half of the power supply voltage.

Referring again to FIG. 5, the DC offset cancellation circuit 80 has a purpose of canceling a DC offset voltage that may occur between the two differential signal lines 102, 103, regardless of whether the DC offset originates in the signal path from the remote transmitter to the receiver 12 or is introduced by the receiver 12. Canceling the DC offset voltage improves the eyewidth of the signal received from the differential signal lines. In one embodiment, the offset compensation circuit 80 operates by adding an input-referred offset voltage to the differential signals. In that case, the added voltage has the same magnitude but the opposite sign as the original DC offset, with the objective of returning the DC offset of the differential signals appearing at the output to zero.

Figure 12:
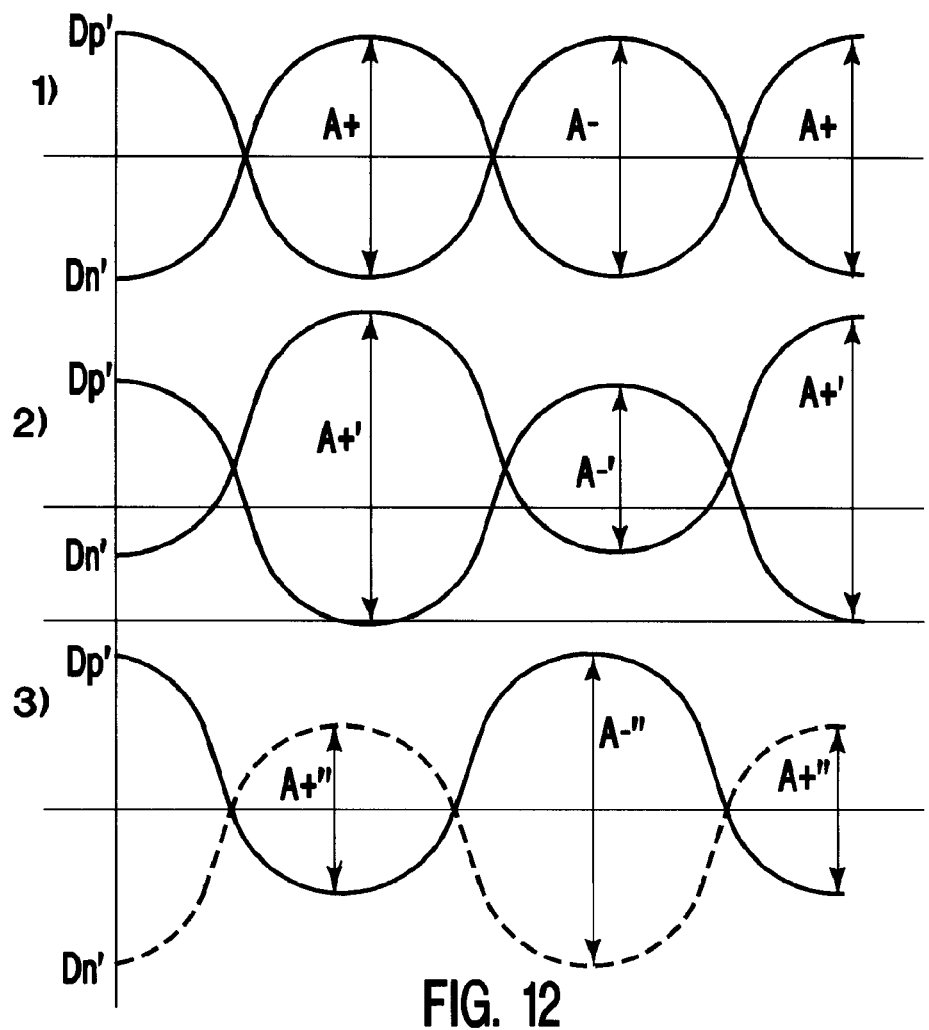
FIG. 12 is a diagram illustrating DC balanced differential signals and signals having DC offsets.

The function of the DC offset compensation unit is best explained with reference to FIG. 12, which illustrates examples of three conditions. In condition 1) of FIG. 12, the differential signals Dn' and Dp' are DC balanced, i.e., both signals have the same DC component, such that no offset compensation is needed. This results in the eye height of the signals at the receiver being the same for both a "1" bit in the data stream (eye height A+), and a "0" bit in the data stream (eye height A−). However, condition 2) of FIG. 12 shows a different situation in which the Dn' signal has a positive DC offset with respect to the Dp' signal. In such case, the eye height A+' of the signal is greater for "1" bits than the eye height A−' of the signal is for "0" bits. Such condition 2) is measured and corrected, as described below. In another condition 3) shown in FIG. 12, the Dp' signal has a positive DC offset with respect to the Dn' signal. In such case, the eye height A+" of the signal is lower for "1" bits than the eye height A−" of the signal is for "0" bits. This condition 3) is also corrected, as described below.

Figure 11:
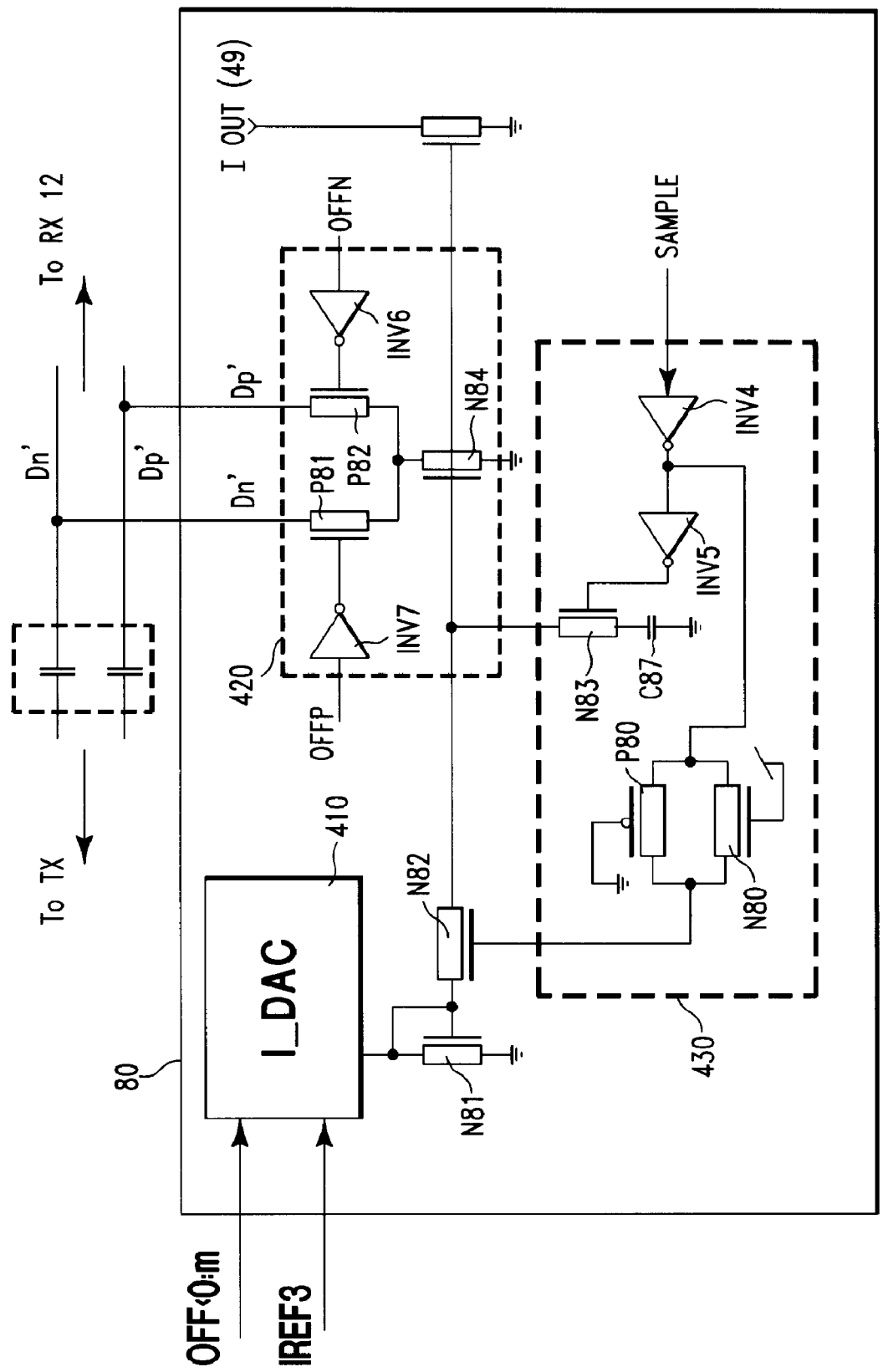
FIG. 11 is a schematic diagram illustrating a DC offset cancellation circuit according to one embodiment of the invention.

A detailed diagram of an exemplary DC offset compensation unit 80 is provided in FIG. 11. DC offset compensation can be enabled or disabled for either DC coupled or AC coupled modes of receiving signals. As illustrated therein, a digital-to-analog converter controlled current generator (I_DAC) 410 is operable to provide a high-resolution of offset compensation of the differential signals Dn' and Dp' at the input to the receiver 12 (FIG. 3). Illustratively, the smallest incremental offset compensation, i.e., the resolution of the circuit, is between about 2 mV and 5 mV, such that the DC offset can be compensated in increments of 2 to 5 mV. Illustratively, the total DC offset compensation that can be provided is between about 30 and 50 mV. The amount of offset compensation applied to one or the other of the differential signals Dn' and Dp' is determined by an eye-center computation circuit in the DFE 13 through a set of binary vectors "OFF<0:m>" outputted therefrom to the I_DAC 410 (FIG. 11), these binary vectors and a reference current "IREF3" from the reference current generator 90 (FIG. 13) being used to generate the offset compensation voltage as determined by the DFE.

With reference to FIG. 11, an offset compensation voltage is applied to one of the differential signals Dn' and Dp' through a circuit 420. That circuit includes a pair of source-coupled n-type field effect (NFET) transistors P81 and P82 and an n-type field effect transistor (NFET) N84 used as a tail device, i.e., a biasing transistor. The biasing transistor N84 has a gate coupled to receive a high-resolution biasing input from I_DAC 410 through NFETs N81 and N82, which determines the magnitude of the offset compensation provided to each individual one of the differential signals Dn' and Dp'. The polarity of the offset compensation is determined by two complementary control bits, "OFFP" and "OFFN", which are generated by the DFE 13 (FIG. 3). Only one such control bit, OFFP or OFFN is active at a time, such that OFFP is active when the offset compensation is to be applied to pull down the Dp' signal, and OFFN is active when the offset compensation is to be applied to pull down the Dn' signal.

The offset compensation circuit 80 further includes an offset value holding circuit 430 used for holding the current value of the offset compensation voltage when a new vector of OFF<0:m> is presented to the I_DAC 410. This circuit is provided to avoid transitional states from being propagated to the differential signals Dn' and Dp' when the offset compensation voltage is being reset to a new value through a new vector of OFF<0:m>. In operation, since offset compensation is operated continuously, when the new vector of OFF<0:m> is presented to the IDAC, a control signal "SAMPLE" is asserted at the input to circuit 430 which holds the previous offset compensation voltage. The control signal "SAMPLE" is applied to NFET N83 that connects to a capacitor C87. An inverted version of "SAMPLE" is applied to the gate of another NFET N82. When the I_DAC 410 is changing from one value of output current to another, NFET N82 is off and NFET N83 is on, which maintains the bias to NFET N84 at the last previously set value. After allowing sufficient time for the I_DAC 410 to settle, the new bias level is applied to tail device (NFET N84) by switching off the "SAMPLE" control signal. In such manner, transitional glitches during the transitioning of the I_DAC 410 from one bias level to another are avoided from being propagated to the differential data signals.

Control over the polarity of the offset compensation voltage is provided by circuit 420 as follows. When the signal "OFFP" is asserted, i.e., by a high voltage at OFFP and a low voltage at OFFN, NFET P81 turns off, and NFET P82 turns on, such that the bias is applied only to the cable that carries the Dp' signal. Otherwise, when the signal "OFFN" is asserted, i.e., by a high voltage at OFFN and a low voltage at OFFP, the bias is applied only to the cable that carries the Dn' signal.

In one embodiment, circuit 420, being coupled to the differential signal lines Dn' and Dp', is also operable as the upchannel transmitter of test unit 70 (FIG. 5) for use in transmitting data in an upchannel direction from the FEI 30 back to the transmitter. In such case, circuit 420 operates to transmit equalization information back to the transmitter, in a manner such as that described above relative to FIG. 5 and FIG. 9.

Figure 13:
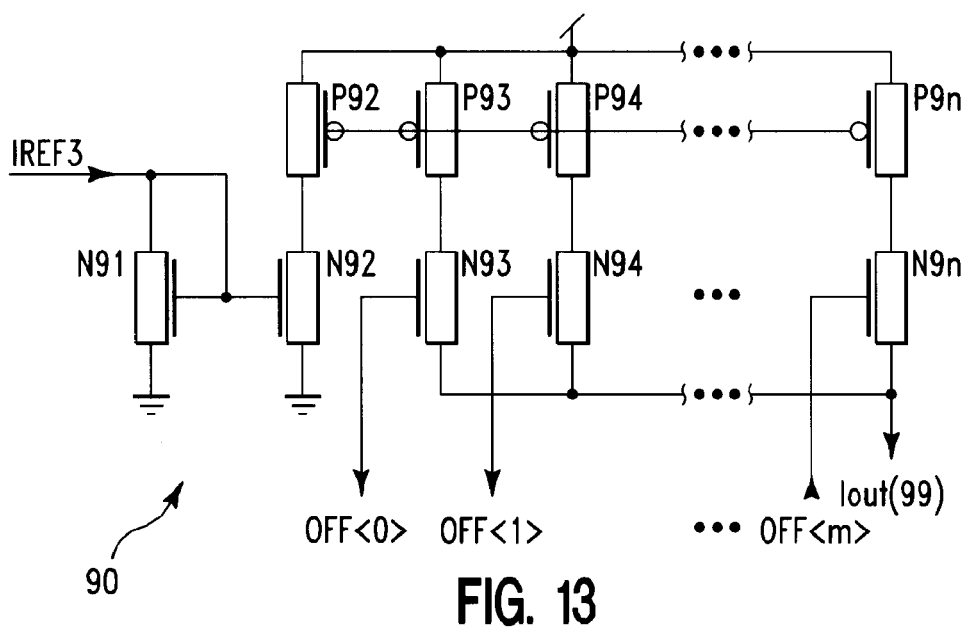
FIG. 13 is a schematic diagram illustrating a reference current generation circuit for inclusion in the DC offset cancellation circuit according to an embodiment of the invention.

FIG. 13 is a schematic diagram of an exemplary I-DAC circuit 90 according to an embodiment of the invention. A reference IREF3 is used for biasing the circuit. Transistors P92 and N92 mirror the IREF3 current that is conducted through transistor N91. A set of binary codes OFF<0:m> is input to each transistor N93, N94, ... N9n to create a summed output current $I_{OUT}$. The devices P93, P94, ... to P9n are designed such that each succeeding one is half the size of the previous transistor in the series. Transistor P93 desirably has the same size as transistor P92, so that when OFF<0> is triggered, the same amount of current is mirrored to the first branch formed by P93 and N93 as through P92 and N92. P94 is half the size of P93, so that when OFF<1> is triggered, half of the amount of current through P92, N92 is mirrored to the second branch formed by P94 and N94, and so on. The source sides of all the transistors N93 to N9n are shorted together, such that the current from all of the branches are summed together as the output current $I_{OUT}$ (99). The output current $I_{OUT}$ 99 is then applied to bias the tail devices of N84 and N85, as shown in FIG. 11.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A method of receiving data, comprising:

utilizing a control signal at a data receiver to switch between an alternating current (AC) transmission receiving mode for receiving an AC coupled mode data signal from a pair of differential signal inputs and a direct current (DC) transmission receiving mode for receiving a DC coupled mode data signal from the pair of differential signal inputs; and operating the data receiver while compensating for DC voltage offset during the AC transmission receiving mode when the offset compensation circuit is enabled, operating the data receiver without compensating for DC voltage offset during the AC transmission receiving mode when the offset compensation circuit is disabled, operating the data receiver while compensating for DC voltage offset during the DC transmission receiving mode when the offset compensation circuit is enabled, and operating the data receiver during the DC transmission receiving mode without compensating for DC voltage offset;

injecting in an upchannel direction, onto transmission lines provided for carrying the differential signal inputs a first test data signal onto a first one of the transmission lines operable to carry a first one of the differential signal inputs, and a second test data signal onto a second one of the transmission lines operable to carry a second one of the differential signal inputs; and at a transmitter connected to at least one of the first and second transmission lines, detecting faults on the at least one of the first and second transmission lines.

2. The method as claimed in claim 1, wherein the first and second test data signals are simultaneously injected in the upchannel direction onto the first and second transmission lines.

3. The method as claimed in claim 1, further comprising receiving the first and second injected test data signals by the data receiver to test the data receiver.

* * * * *